Patented May 12, 1953

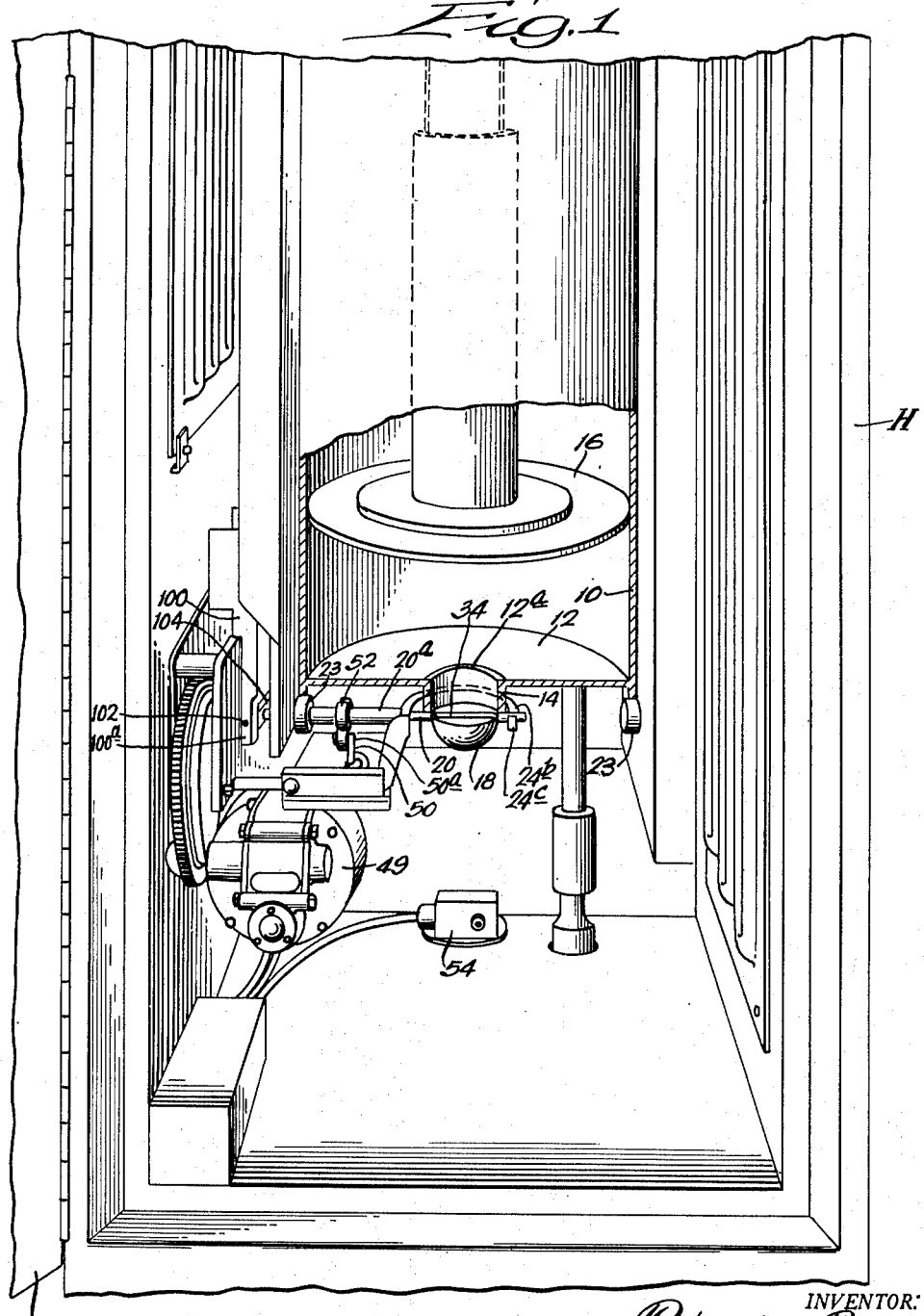

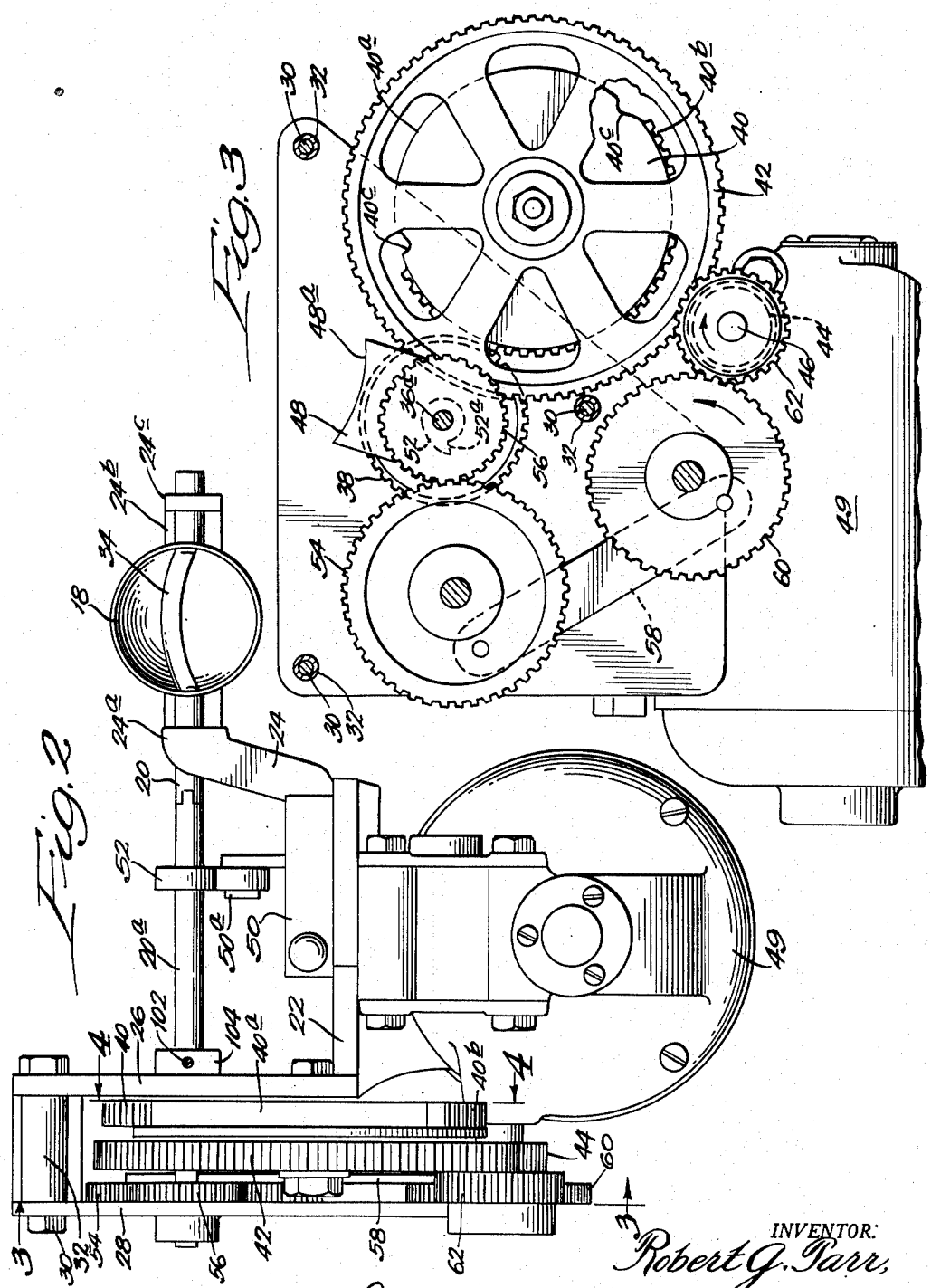

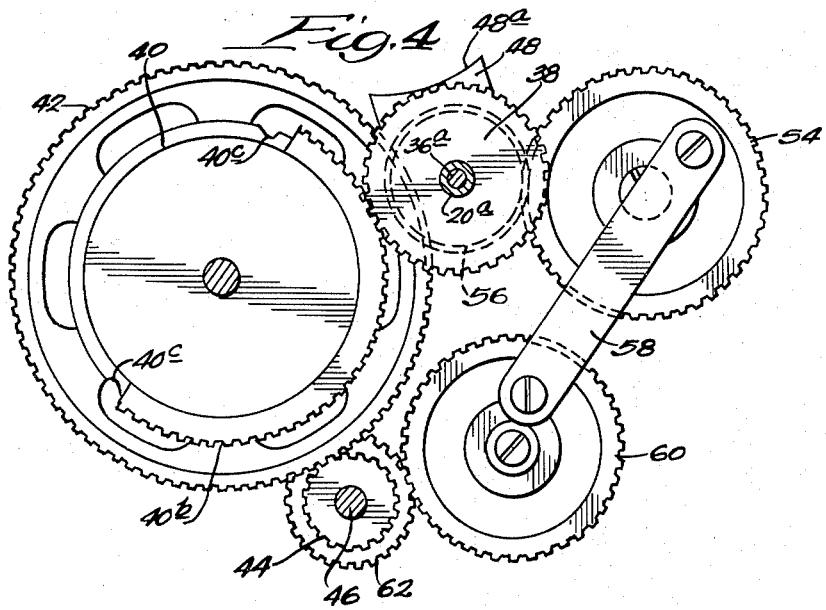
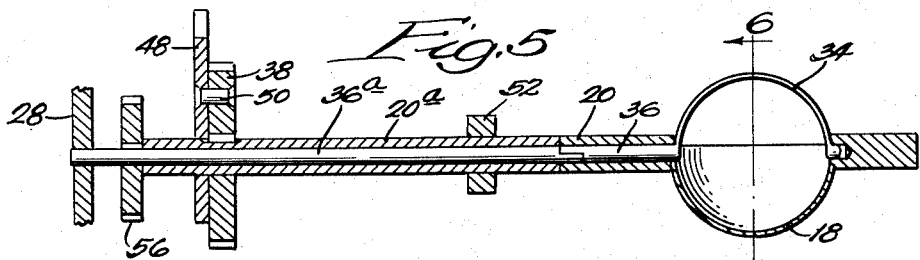
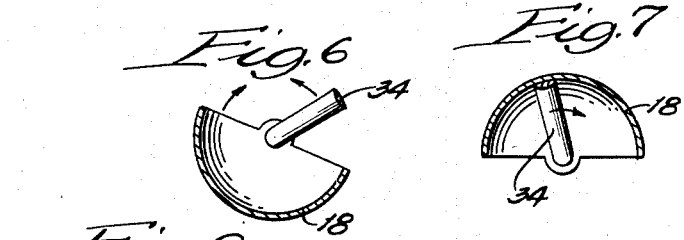
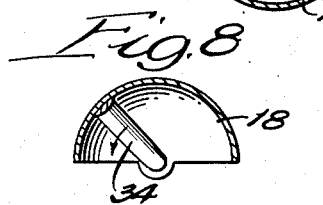
INVENTOR:
Robert G. Tarr,
BY Dawson, Ooms, Booth and Spangenberg,
ATTORNEYS.

2,638,065

UNITED STATES PATENT OFFICE 2,638,065

MECHANISM FOR MAKING AND DEPOSITING BALLS OF ICE CREAM OR THE LIKE

Robert G. Tarr, Villa Park, Ill., assignor of one-half to Jack C. Webb, Chicago, Ill., and one-half to Taft Moody, Memphis, Tenn.

Application July 16, 1949, Serial No. 105,222

10 Claims. (Cl. 107—8)

The present invention relates to an improved automatic mechanism to make balls of ice cream or like material and to deposit them in a suitable container.

In my copending patent applications entitled "Ice Cream Cone Dispenser," S. N. 81,120 filed March 12, 1949, and "Automatic Dispenser for Ice Cream Balls or the Like," S. N. 112,725, filed August 27, 1949, I have described and claimed improved automatic ice cream cone making and dispensing machines. The present invention relates to an improved mechanism to discharge ice cream balls formed by the ball-forming elements of that machine or a similar machine arranged for soda fountain use.

In accordance with the present invention, ice cream balls are formed by forcing ice cream into an upright cup having an interior or cup portion defining a surface of revolution. The cup is thereafter inverted and coacts with a knife which mates with the interior of the cup to cut the top portion of the ball. The cup then dwells in the inverted position while the knife executes oscillations across the cup surface to release the ice cream ball from the surface of the cup. The ball then drops into a suitable receptacle.

It is a general object of the present invention to provide an improved mechanism for making and depositing balls of ice cream or the like.

Another object is to provide an improved mechanism to form balls of ice cream or the like that positively releases the balls from the cup element.

A further object of the present invention is to provide an improved mechanism for forming ice cream balls wherein the cup is held in an inverted position while the ice cream is separated therefrom.

Yet another object of the present invention is to provide an improved mechanism for forming and depositing an ice cream ball wherein a knife executes a preliminary ball-separating movement while the cup first cuts into the ice cream.

The novel features which I believe to be characteristic of my invention are set forth with particularity in the appended claims. My invention itself, both as to its organization and method of operation, together with further objects and advantages thereof my best be understood by reference to the following description taken in connection with the accompanying drawings, in which:

Fig. 1 is a broken away view of a soda fountain type ice cream dispenser constructed in accordance with the principles of the present invention;

Fig. 2 is a fragmentary front elevational view of the ball forming and depositing mechanism of the structure of Fig. 1;

Fig. 3 is a cross sectional view through axis 3—3, Fig. 2;

Fig. 4 is a cross sectional view through axis 4—4, Fig. 2;

Fig. 5 is an axial cross sectional view through the cup and knife and their associated driving elements;

Fig. 6 is a cross sectional view through axis 6—6, Fig. 5 showing the positions of the parts driving the first quarter cycle of operation;

Fig. 7 is a cross sectional view through the axis 6—6, Fig. 5 showing the positions of the parts driving the second quarter cycle of operation; and, Fig. 8 is a cross sectional view through the axis 7—7, Fig. 5 showing the positions of the parts during the third quarter cycle of operation.

Referring now to Figure 1, there is shown at H a refrigerated housing having a front access door D. A cylindrical ice cream container 10 is disposed centrally within the housing and terminates at its bottom in a plate 12 having a central circular aperture 12a. A cylindrical ice cream chute 14 depends from bottom plate 12 adjacent the aperture 12a.

Ice cream is forced downwardly from cylinder 10 through chute 14 by pressure exerted by plunger 16. Elements (not shown) urge this plunger downwardly after each ice cream ball is formed to force the ice cream for the next ball through the chute 14.

Upon travelling through the chute 14, the ice cream passes into the cup 18. This cup is in registry with chute 14 and is normally held in an upright position. Its interior surface defines a surface of revolution, preferably a sphere, so that the cup forms an ice cream ball as it is rotated from the upright position to the inverted position.

The cup 18 is supported by a cup shaft 20, Fig. 2, for rotation about the axis of rotation of its interior surface. The cylinder 10 is supported by a pair of bearings 23 concentrically disposed with respect to shaft 20. These bearings permit the cylinder 10 to be reloaded by retracting plunger 16 and tilting the cylinder forwardly.

The cup shaft 20 mates with and receives the shaft extension 20a. These shafts are supported by the carriage 22. This support is defined by the bracket 24 and the back plate 26. The former bracket extends upwardly from the carriage 22 at its forward end and defines a bearing portion 24a to receive shaft 20. The bracket 24 extends in a semicircular arcuate portion 24b, Figs. 1 and 2, which terminates at its forward end in the bearing 24c.

Shaft 20a is snugly received in the back plate 26. It is also supported by the interior concentric shaft 36a which extends to and is snugly received in the plate 28. The latter plate is held in spaced relation with plate 26 by bolts 30 and sleeves 32.

A knife or scraper 34 is disposed within the cup 18 to scrape the interior surface of the cup and separate ice cream therefrom. This knife is shaped to mate with and conform to the interior surface of cup 18 and is mounted on shaft 36, Fig. 5. As indicated in that figure, shaft 36 mates with and receives shaft 36a which extends beyond the rear end of hollow shaft 20a. Shaft 36a is snugly received in the plate 28 to define a bearing support for shafts 20a and 36a as shown in Fig. 5.

Driving rotations are imparted to the cup shaft 20 by the gear 38. This gear meshes with the mutilated gear 40, Fig. 3. Gear 40 is attached to ball gear 42 which in turn meshes with the drive pinion 44. The latter is keyed to the shaft 46 of motor 49.

A catch plate 48 is mounted on shaft 20a adjacent gear 38 and is held to gear 38 by screw 50. Plate 48 has a circular concave portion 48a adapted to mate with and receive the circular mutilated portion 40a of the gear 40.

The number of teeth 40b on the mutilated gear 40 is equal to the number of teeth on gear 38. Consequently, the gear 38, and shafts 20a and 20, execute a full rotation for each revolution of the gear 40.

The space on gear 40 not required for teeth 40b is mutilated to define a circular portion 40a. At the junctions between the circular portion 40a and the teeth 40b of the gear 40, the gear has notches 40c. Each of these notches is cut out to receive the corner of the catch plate 48 as that plate rotates into engagement with the circular portion 40a of the gear 40.

In the normal or relaxed condition of the mechanism, the cup 18 is in the upright position and the center portion of the teeth 40b meshes with the gear 38. As the gear 40 is rotated by motor 49, the cup 18 is rotated to the inverted position where the teeth 40b end and the catch plate 48 rides into engagement with the mutilated portion 40a of the gear 40. At this time the cup 18 is held in the inverted position by the engagement of the catch plate 48 and the gear 40, thus causing dwell of the cup in the inverted position. Thereafter, as the teeth 40b again engage the teeth of gear 38, the rotation of the cup 18 is continued until that cup is restored to the upright position.

Cam switch 50, Fig. 1, energizes motor 49 in accord with the rotations of the cup 18. This switch has an arm 50a which rides on cam 52 which is held on shaft 20a. As shown in Fig. 3, this cam has a raised portion 52a which depresses the arm 50a of switch 50 when cup 18 is in the upright position. An electrical circuit of well known design (not shown) deenergizes the motor 49 when the arm 50a of switch 50 is thus depressed.

The motor 49 is started over the dead spot associated with operation of the switch 50 by momentarily closing a suitable starting switch 54, Fig. 1. Preferably this switch is located at the rear of housing H behind the cup 18 and is closed by insertion of a drawer (not shown) carrying a milk shake can or other receptacle in which the ice cream ball is to be deposited. Elements (not shown) open the switch 54 a predetermined time after it is initially closed.

The knife 34 is moved in arcuate oscillating motions over the space defined by the interior of cup 18 when in the inverted position. These movements are imparted to knife 34 by the drive gear 54, Fig. 3, which mates with gear 56 on the shaft 36a, Fig. 5.

Gear 54 is driven in oscillating movements by the crank arm 58, shown in full view in Fig. 4. This crank arm is pinned at its opposite ends to gears 54 and 60, respectively, to drive the former gear in oscillating movements as the latter gear rotates. Gear 60 meshes with gear 62 which is held on the shaft of motor 49.

When the motor 49 causes shaft 46 and gear 62 to rotate, as required to turn cup 18 over a full rotation, the gear 60 rotates two full revolutions. During this time, the gear 54 executes two full oscillations and twice drives knife 34 from the position shown in Figure 1 to the diametrically opposed position and return. During each of these oscillations, the knife traverses the space defined by the cup 18 when in the upright position. On the first half cycle of rotation, the knife cuts a path in the ice cream and on the second and third half cycles it traverses the interior of the cup 18. On the last half cycle the knife returns to its starting position.

*Operation*

When the cycle of operations is started, the cup 18 faces upwardly and is filled with ice cream. The knife 34 is at the edge of cup 18 as shown in Fig. 1. When the switch 54 is depressed, the motor 49 is energized and starts rotation of gears 44 and 62.

During the first quarter of the complete cycle of operations, the cup 18 rotates to the inverted position while the knife 34 rotates to a position diametrically opposed to its initial position. Consequently, the top surface of the ice cream ball is simultaneously cut in opposite directions by the knife 34 and the cup 18 as shown in Fig. 6. When the knife 34 meets the leading edge of cup 18, it traverses the interior of cup 18 to make an initial ice cream separating pass.

During the second and third quarters of the cycle of operation, the cup 18 is held in the inverted position of dwell by the catch plate 48 which rides on the circular portion 40a of the mutilated gear 40. At this time the knife 34 returns to its initial position as shown in Fig. 7 and thereafter begins execution of its second oscillation as shown in Fig. 8.

At some time during the first three quarters of the operating cycle, the ice cream ball separates from the cup 18 and drops into the container below. Since the knife 34 executes three complete traverses of the upper face of the ball and two and one half of these traverses are against the face of cup 18, even the most difficult to handle types of ice cream are positively severed from the cup.

During the last quarter of the operating cycle, the cup 18 returns to the upright position as gear 38 again meshes with the teeth 40b of gear 40 and the knife 34 rotates back to its initial position of Fig. 1. Thereafter, plunger 16 is forced downwardly to push ice cream through chute 14 and into the cup 18 to load that cup to form a new ice cream ball.

While I have shown the structure of the present invention as it may be used to form ice cream balls for soda fountain use and deposit the same in a milk shake mixer or the like, it will be evident that the mechanism may also be used in other apparatus such as apparatus to make and deliver ice cream cones. In either event, the ice cream ball is cut by the cup 18 and knife 34 and is positively separated from the cup to fall into the intended receptacle and the possibility of accidental sticking of the ice cream is avoided.

The carriage 22 is rockably secured to the housing H by the bracket 100. This bracket depends from housing H as shown in Figure 1 and terminates in a pair of spaced fingers 100a. These fingers have aligned openings to receive the pin 102 which extends through them and through the apertured block 104 (Figs. 1 and 2) to support the carriage 22.

As will be evident from Figures 1 and 2, the axis of support for carriage 22 passes through the common axis of shaft 20a and the bearings 23.

While I have shown and described a specific embodiment of the present invention, it will, of course, be understood that I do not wish to be limited thereto and that by the appended claims I intend to cover all modifications and alternative constructions falling within the true spirit and scope of my invention.

What I claim as new and desire to secure by Letters Patent of the United States is:

1. In an automatic mechanism to form and deposit ice cream balls or the like, an ice cream cup having an interior defining a surface of revolution, an arcuate knife having a radius of curvature corresponding to the interior surface of the cup, means supporting the knife in mating relation with the interior of the cup, means operable to rotate the cup from an upright position to an inverted position and cause dwell thereof in the inverted position, and means operable to rotate the knife over the space defined by the cup while the cup is being rotated and during the dwell thereof whereby the interior of the cup is traversed by the knife while in inverted position.

2. In a mechanism to form ice cream balls or the like, an ice cream cup having an interior defining a surface of revolution, an arcuate knife adapted to wipe across the interior surface of the cup, means supporting the knife in mating relation with the interior of the cup, means operable to rotate the cup from an upright position to an inverted position and cause dwell thereof in the inverted position, and elements operable to cause the knife to traverse the cup during the dwell thereof.

3. In a mechanism to form ice cream balls or the like, an ice cream cup having an interior defining a surface of revolution, an arcuate knife having a curvature corresponding to the interior surface of the cup and mounted in mating relation therewith, means operable normally to hold the cup in an upright position, means operable to rotate the cup from the upright position to the inverted position and cause dwell thereof at the inverted position, and means operable to cause the knife to traverse the cup from one side to the other during the dwell thereof.

4. In a machine to form ice cream balls or the like, the combination comprising an ice cream container having a circular bottom opening, a semi-spherical cup disposed below the opening and in registry therewith, a semicircular knife adapted to mate with the interior of the cup, means supporting the knife to traverse the cup, elements operative to rotate the cup from the upright position to the inverted position and cause dwell thereof in the inverted position, and mechanism operative to cause the knife to traverse the cup during the dwell thereof.

5. In a mechanism to form balls of ice cream or the like, a cup having an interior defining a surface of revolution, an arcuate knife having a curvature corresponding to the interior surface of the cup and mounted in mating relation therewith, a pair of shafts supporting the cup and the knife respectively for movements about the axis of revolution of the interior surface of the cup a driving means, an operative connection between the driving means and the first shaft to rotate the cup to inverted position and return with a relaxed condition therebetween for causing the cup to dwell while in the inverted position, and an operative connection between the driving means and the second shaft to cause the knife to traverse the cup during the dwell thereof.

6. In a mechanism to form balls of ice cream or the like, a cup having an interior defining a surface of revolution, a cup shaft operably connected to the cup, a drive shaft, intermittent drive means connecting the cup shaft and the drive shaft and operable to rotate the cup from an upright position to an inverted position and return it to the upright position after predetermined dwell in the inverted position, an arcuate knife having a curvature corresponding to the interior surface of the cup and mounted in mating relation therewith, a knife shaft operatively connected to the knife, and crank means connecting the knife shaft to the drive shaft and operative to oscillate the knife over the arc defined by the cup when in the inverted position.

7. In a mechanism to form balls of ice cream or the like, a cup having an interior defining a surface of revolution, a cup shaft operably connected to the cup, a drive shaft, intermittent drive means connecting the cup shaft and the drive shaft and operable to rotate the cup from an upright position to an inverted position and return it to the upright position after predetermined dwell in the inverted position, an arcuate knife having a curvature corresponding to the interior surface of the cup and mounted in mating relation therewith, a knife shaft operatively connected to the knife, and crank means connecting the knife shaft to the drive shaft and operative to oscillate the knife over the arc defined by the cup when in the inverted position, the crank means being operable to cause the knife to execute at least one complete oscillation while the cup dwells in the inverted position.

8. In a mechanism to form balls of ice cream or the like, a cup having an interior defining a surface of revolution, a shaft operably connected to the cup, a drive shaft, a mutilated gear adapted to be driven by the drive shaft to rotate the cup from an upright to an inverted position and to cause dwell of the cup in the inverted position, an arcuate knife having a curvature corresponding to the interior surface of the cup and mounted in mating relation therewith, a knife shaft operably connected to the knife, crank means connecting the drive shaft and the knife shaft and operable to cause a plurality of oscillations of the knife across over the arc defined by the cup when in the inverted position each time the cup executes a full revolution.

9. In a mechanism to form balls of ice cream or the like, a cup having an interior defining a surface of revolution, a shaft operably connected to the cup, a drive shaft, a multilated gear adapted to be driven by the drive shaft to rotate the cup from an upright to an inverted position and to cause dwell of the cup in the inverted position, the mutilated gear having a substantially circular mutilated portion, a cam operably connected to the cup and adapted to ride on the mutilated portion of the gear to anchor the cup in the inverted position, an arcuate knife having a curvature corresponding to the interior surface of the cup and mounted in mating relation therewith, a knife shaft operably connected to the knife, crank means connecting the drive shaft and the knife shaft and operable to cause a plurality of oscillations of the knife across over the arc defined by the cup when in the inverted position each time the cup executes a full revolution.

10. In a mechanism to form balls of ice cream or the like, a cup having an interior defining a surface of revolution, an arcuate knife having a curvature corresponding to the interior surfaces of the cup and mounted in mating relation therewith, a cup shaft operatively connected to the cup, a knife shaft operatively connected to the knife, a drive shaft, means interconnecting the cup shaft and the drive shaft whereby responsive to continuous rotation of the drive shaft the cup is caused to rotate to inverted position, dwell while in the inverted position and then return to normal position, and crank means operatively connecting the knife shaft with the drive shaft to cause oscillation of the knife over the area defined by the cup when inverted whereby the knife blade rotates during the dwell of the cup in its inverted position.

ROBERT G. TARR.

References Cited in the file of this patent

UNITED STATES PATENTS

| Number | Name | Date |
|---|---|---|
| 1,351,903 | Hara | Sept. 7, 1920 |
| 1,412,727 | Walsh | Apr. 11, 1922 |
| 1,544,802 | Burkeman | July 7, 1925 |